United States Patent [19]
Stark et al.

[11] Patent Number: 5,482,622
[45] Date of Patent: Jan. 9, 1996

[54] FILTER FOR INSTALLATION IN AN ANNULAR GROOVE

[75] Inventors: Kris R. Stark, Noblesville; Michael C. Lewman, Muncie; Stephen L. Hardin, Anderson; William J. Chafin, Alexandria, all of Ind.

[73] Assignee: General Motors Corporation, Detroit, Mich.

[21] Appl. No.: 228,625

[22] Filed: Apr. 18, 1994

[51] Int. Cl.$^6$ .................................................. B01D 46/02
[52] U.S. Cl. ...................... 210/232; 210/435; 210/497.2; 210/499; 156/245; 156/580.2; 55/500; 55/502; 55/525; 55/DIG. 31; 55/DIG. 45
[58] Field of Search ................... 29/163.6, 163.8; 156/73.1, 73.4, 272.2, 580.1, 308.2, 245, 580.2; 264/DIG. 48, DIG. 67, DIG. 70; 55/DIG. 5, 502, 490, 497, 498, 500, DIG. 45, 525, DIG. 31; 210/232, 238, 435, 497.01, 497.2, 499

[56] References Cited

U.S. PATENT DOCUMENTS

| | | | |
|---|---|---|---|
| 2,075,639 | 3/1937 | Castle | 29/163.5 |
| 2,550,070 | 4/1951 | Brecque et al. | 29/148 |
| 2,963,163 | 12/1960 | Veres | 210/496 |
| 4,464,260 | 8/1984 | Duneau | 210/232 |
| 4,592,381 | 6/1986 | Troy | 137/203 |
| 4,969,999 | 11/1990 | Riddell | 210/497.01 |
| 5,011,555 | 4/1991 | Sager | 156/580.1 |
| 5,102,436 | 4/1992 | Grabowski | 55/498 |
| 5,269,917 | 12/1993 | Stankowski | 210/232 |

Primary Examiner—Robert A. Dawson
Assistant Examiner—W. L. Walker
Attorney, Agent, or Firm—Jeffrey A. Sedlar

[57] ABSTRACT

A fluid filter for a solenoid which includes a flexible filter element and two plastic tips for installation in an annular groove. The plastic tips are arcuate shaped to fit tightly against the outside diameter of the annular groove when the flexible filter element is wrapped around the annular groove during installation and the tips are bonded together to secure the filter to the groove.

5 Claims, 2 Drawing Sheets

FILTER FOR INSTALLATION IN AN ANNULAR GROOVE

BACKGROUND OF THE INVENTION

This invention relates to a fluid filter. More particularly, the invention is directed to a filter designed for installation in an annular groove.

In certain applications, a fluid filter must meet stringent performance and durability requirements. One such application is a supply filter for a variable bleed solenoid used for controlling line pressure in a vehicle's automatic transmission. The solenoid is susceptible to contamination in its fluid supply. Due to the internal design of the variable bleed solenoid and the small orifices contained therein, contamination migrating inside the device can affect its performance. The filter, when installed on the variable bleed solenoid, must adequately remove contaminates from the supply fluid so that the solenoid continues to operate properly. In addition, the filter must be able to withstand relatively high temperatures, pressures and vibration levels present in the transmission environment. It is imperative that the filter remains intact and does not become loose or deformed under the environmental conditions present.

It is conventional to use a supply filter designed for installation in an annular groove around the housing of the variable bleed solenoid. A typical design for a solenoid filter is shown in FIG. 5. The filter is molded in a cylindrical configuration and split to permit assembly into an annular groove of a solenoid housing. The design contains a polymeric frame and ribs to add rigidity to the filter. Designed in rigidity is directed to preventing fluid contamination from entering the solenoid around the edge of the filter.

The filter element is typically comprised of a screen-like material onto which the plastic frame is integrally molded. This type of design, which requires the part to be molded in an annular configuration incorporating ribs and a frame has proven difficult to manufacture. The difficulties associated with producing a filter of this design include accurately positioning the filter element material within the annular mold. In addition, malformation of the molded features of the filter can occur due to the need for plastic to flow about the filter element to form the frame and ribs. Movement of the filter element during the molding process can contribute to malformation problems. Another potential problem is formation of the frame and ribs with a missing filter element.

Because of the difficulties associated with producing a filter according to prior practice, supply filters typically require 100 percent inspection to ensure proper filter element positioning and presence. The cost of a filter according to this design is driven up due to the complexity of the manufacturing requirements.

Another drawback associated with a filter according to the prior art design as shown in FIG. 5 is that the frame and rib construction obstructs filter element area that would otherwise be available to remove contaminants from the fluid supplied to the solenoid. Accordingly, problems associated with filter elements used to remove contaminants from the supply fluid to a variable bleed solenoid exist. It would be preferable if a filter was designed for ease of manufacturing while still providing adequate filtering for the contaminant sensitive application requirements.

SUMMARY OF THE INVENTION

A general object of the invention is to provide a filter with adequate durability to perform under the hostile environmental conditions found within an automatic transmission and that is easily manufactured. In accordance with the present invention a fluid supply filter comprised of a mesh screen filter element with two mating tips connected thereto is provided. The tips are designed for connection to one another after the filter is positioned around an annular groove.

The invention incorporates features into the tips of the filter to facilitate their connection to one another. One or more projections serving as energy directors are provided on the mating surface of one tip thereby concentrating the bond and providing a secured connection. To increase the strength and the reliability of the bond used to connect the tips together, a textured surface is provided on the mating surface of the opposite tip. In addition, supports are preferably provided on the underside of one tip to provide support for a bonding horn as it applies pressure to the area of the energy directors.

The filter design according to this invention is directed to providing a filter that is easily manufactured. The invention's design incorporates separate tips that can be molded with the filter element laying flat within the mold. This design lends itself to molding using a simple straight pull mold. A straight pull mold contains only a top and bottom cavity and opens by separating the cavities. The flat filter element can be readily captured within the mold while the tips are formed.

The invention maximizes the surface area of the filtering element. By eliminating the need for a plastic frame around the filter element, the design provides a larger surface area available for filtering. A larger filter surface area facilitates flow, particularly at low temperatures when transmission fluid viscosity is relatively high.

The invention provides a filter that allows the inside diameter to vary. This characteristic is important because it provides adjustment for variability in diameter of the groove that the filter is installed around. The design of the tips provides for adjustment of the filter allowing the inside diameter to vary according to the particular part it is installed around. This feature facilitates a secure assembly to prevent contamination from entering the solenoid around the edge of the filter.

DETAILED DESCRIPTION OF THE PRESENTLY PREFERRED EMBODIMENTS

Figure 1:
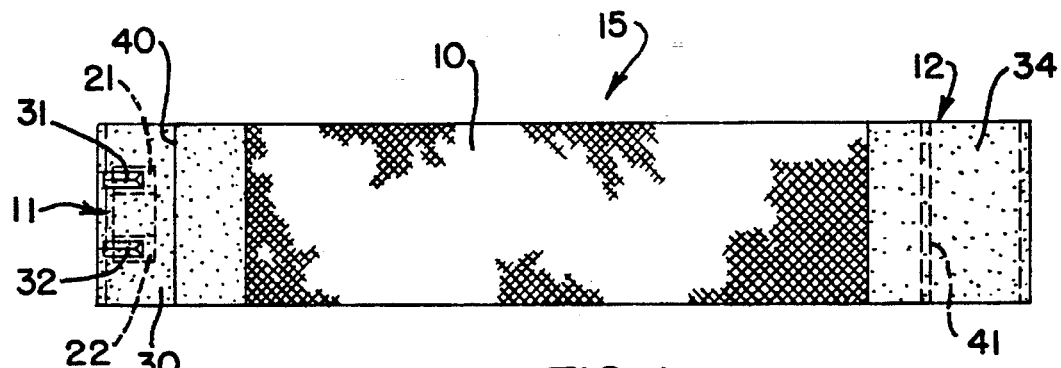
FIG. 1 is a plan view of the supply filter.
Figure 2:
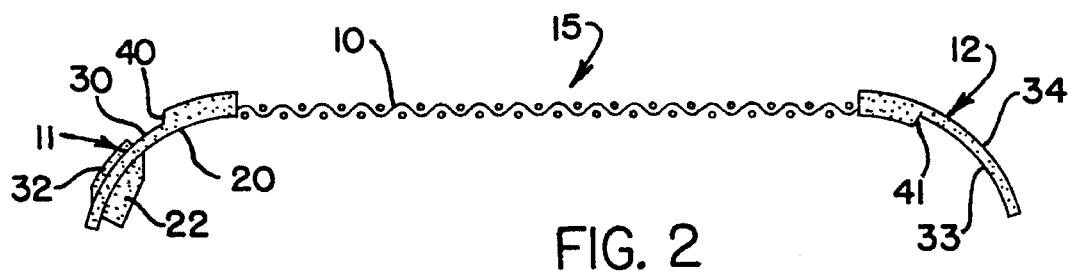
FIG. 2 is a side view of the filter shown in FIG. 1.

Referring to FIGS. 1 and 2, illustrated is a supply filter 15 comprised of a filter element 10 and polymeric tips 11 and 12. The views of filter 15 illustrate a straightened configuration as would be exhibited when the filter is removed from a mold after formation of tips 11 and 12.

The filter element 10 is preferably made of a metal mesh screen material of a gauge suitable to protect the small solenoid orifices the filter safeguards. Using a metal screen as the filter element provides sufficient strength to allow eliminating the frame and ribs previously included in variable bleed solenoid supply filters. A preferred material is stainless steel mesh screen with 178 micron openings. Alternative materials of similar strength and sizes could also be used for filter element 10. Filter element 10 is formed in a preferred flat rectangular configuration with flexibility, facilitating installation by being wrapped around an annular groove found in a spool shaped solenoid housing.

Molded onto the ends of filter element 10 are two arcuate plastic tips 11 and 12. The tips are integrated onto filter element 10 by the molding process. When assembled in an annular groove of a solenoid housing, filter element 10 is tightly wrapped around the groove and tips 11 and 12 are connected together, preferably by application of ultrasonic energy to form a mechanical bond.

Tip 11 includes projections 21 and 22 on the inside surface 20 thereof, serving as bond supports. Bond supports 21 and 22 provide support for a bonding horn 70, shown in FIG. 4, as it applies pressure to the tips during a bonding operation. The support provided by supports 21 and 22 prevents disfigurement of the assembly by pressure applied by horn 70 and aids in obtaining a secure bond.

Bonding horn 70 is part of an ultrasonic welding machine (not illustrated) and supplies the means for connecting arcuate tips 11 and 12 together to secure filter 15 in the annular groove 50. Bonding horn 70 contacts arcuate tip 12 and applies pressure thereto. While applying pressure, a sufficient amount of ultrasonic energy is applied through bonding horn 70 to soften and melt the arcuate tips 11 and 12 causing a mechanical bond therebetween.

On the outer surface 30 of the arcuate tip 11 are projections 31 and 32 that serve as energy directors for bonding purposes. Projections 31 and 32 increase the strength and reliability of the bond by concentrating the contact surface area between arcuate tip 11 and 12 for application of ultrasonic energy supplied by bonding horn 70. Providing a concentrated contact area increases the ability to control the location and quality of the bond and establishes a locale for the flow of material melted by the ultrasonic energy to begin.

An inside surface 33 of arcuate tip 12 is adapted to mate with the outside surface 30 of arcuate tip 11 about projections 31 and 32. Surface 33 is molded with an irregular textured surface feature. Textured surface 33 acts in cooperation with projections 31 and 32 to facilitate a secure bond between arcuate tip 11 and arcuate tip 12. The texturing responds to the application of ultrasonic energy similarly to energy directors but to a lesser extent. Textured surface 33 therefore provides a collateral mechanism in addition to projections 31 and 32 for aiding in establishing a secure consistent bond between arcuate tips 11 and 12 through the ultrasonic bonding process.

Figure 3:
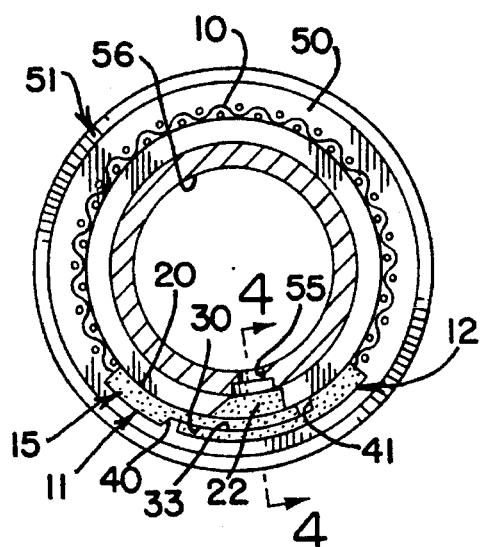
FIG. 3 is a side view of the filter shown in FIG. 1 in an as-installed configuration in an annular groove of a solenoid housing.

FIG. 3 illustrates the flexibility of filter element 10, which is essential for installation of the supply filter in an annular groove. Filter element 10 is flexible through a minimum range from a flat configuration as illustrated in FIGS. 1 and 2 through a cylindrical configuration as illustrated in FIG. 3. Flexibility permits the filter to be molded in a flat configuration thereby simplifying the molding operation while still being readily mountable in an annular configuration.

Adjustability of the inside diameter of the supply filter is readily demonstrated in FIG. 3. The surfaces 30 and 33 are slidable upon each other up to the steps 40 and 41 that provide sufficient clearance to ensure a tight wrap can be obtained. The amount of adjustment provided by this mechanism is sufficient to compensate for variations in the outside diameter of the annular groove of the solenoid housing into which the supply filter is installed.

Figure 4:
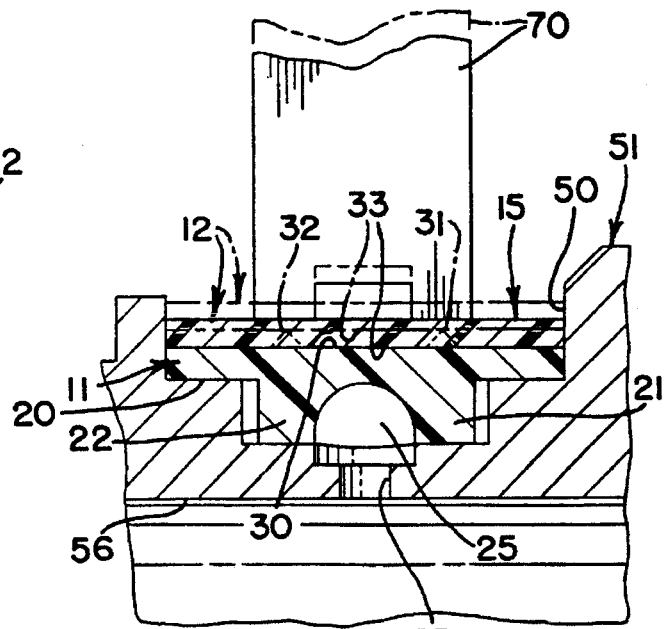
FIG. 4 is a partial sectional view of FIG. 3.
Figure 5:
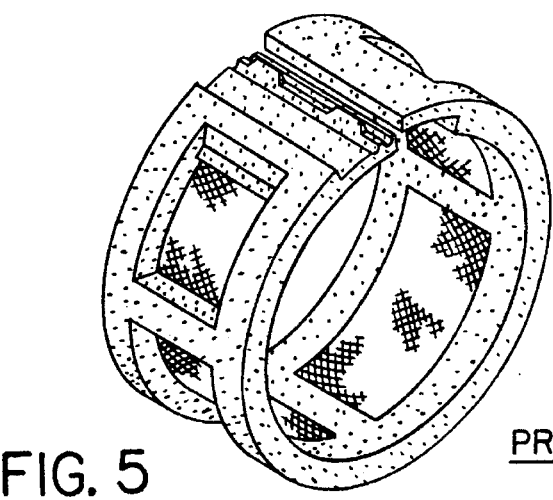
FIG. 5 is a perspective view of a prior art filter.

FIG. 4 shows a partial sectional view of the supply filter as installed in an annular groove 50 of a spool-shaped section of solenoid housing 51 as shown in FIG. 3. The spool shaped housing section includes a cylindrical body with an annular ridge on each end thereof to contain the filter. A first fluid passage 55 extends radially inward through the cylindrical body of spool shaped housing section 51. A second fluid passage 56 extends axially through the spool and intersects the first fluid passage 55. The supply filter 15 removes contaminates from the fluid entering the first fluid passage 55 on route to the second fluid passage 56 and into the solenoid housing.

The arcuate shape of tips 11 and 12 is designed to mate with the curve of the outside diameter of the annular groove 50.

Bond supports 21 and 22 contact the bottom of groove 50 to provide support during the application of bonding horn 70. Once bonded, the filter is captive in annular groove 50 to prevent the passage of contamination into the solenoid. FIGS. 3 and 4 show the bond supports 21 and 22 straddling an orifice designated as fluid passage 55. Although it is not preferred to install filter 15 in this orientation, the opening 25 provided between bond supports 21 and 22 ensures that fluid flow is not interfered with. This feature is directed at maintaining an unobstructed fluid passage through fluid passage 55 even though the orientation of filter 15 may shift to the position shown as a result of high vibration conditions.

When the filter element 10 is tightly wrapped around housing 51 and a bond is secured between tips 11 and 12, the filter 15 is capable of operating under the adverse pressure, temperature and vibration conditions which it is subjected to, when installed in an automatic transmission, without becoming deformed or loose.

Figure 6:
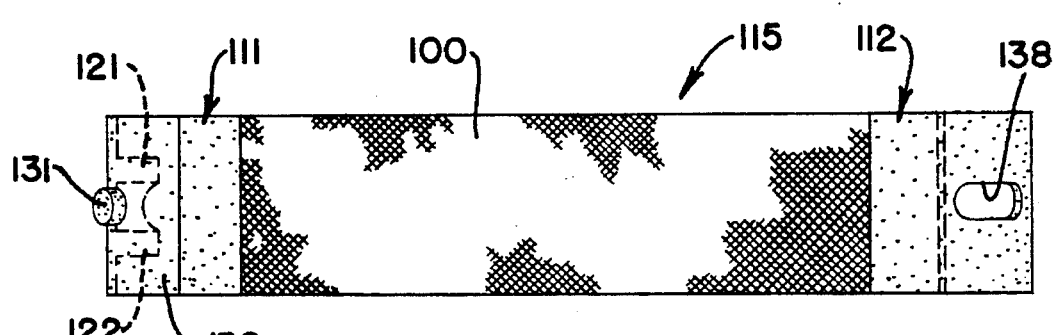
FIG. 6 is a plan view of an alternative embodiment of a filter according to the present invention.
Figure 7:
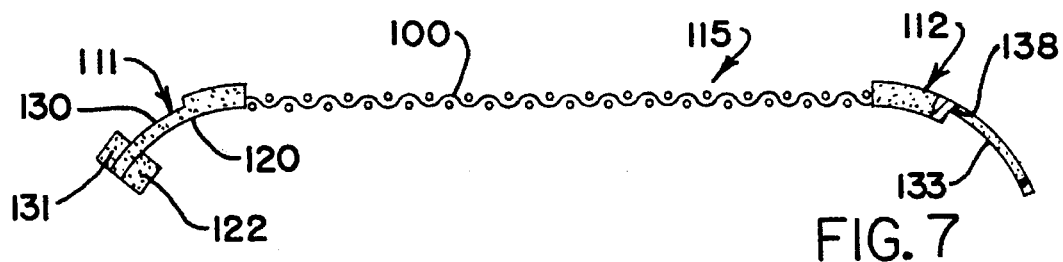
FIG. 7 is a side view of the filter of FIG. 6.
Figure 8:
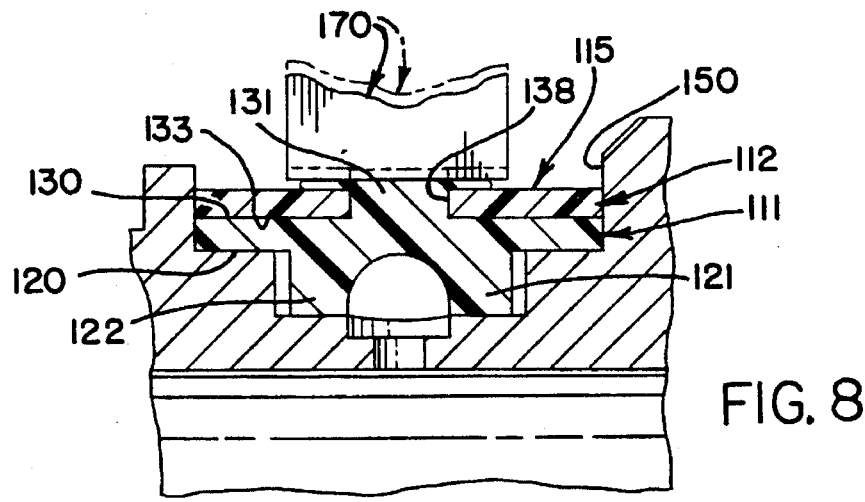
FIG. 8 is a partial sectional view of the filter of FIG. 6 installed in an annular groove of a solenoid housing.

Illustrated in FIGS. 6 and 7 are two views of an alternative embodiment of the present invention. This embodiment includes flexible mesh screen filter element 100. Attached to opposite ends of filter element 100 are arcuate plastic tips 111 and 112 designed to mate at surfaces 130 and 133. Tip 111 includes cylindrical projection 131 formed on outside surface 130 to facilitate connection of the mating tips. On inside surface 120 of tip 111 are bond supports 121 and 122. The bond supports are better shown in cross section in FIG. 8 as installed in solenoid housing groove 150. Tip 112 incorporates an elongated slot 138 that accepts projection 131 allowing for adjustable positioning of the mating tips and aiding in tip bonding. Bonding horn 170 applies energy to the filter 115 to bond tips 111 and 112 together.

The embodiments of the invention in which an exclusive property or privilege is claimed is defined as follows:

1. A filter for installation in an annular groove comprising:
   a frameless mesh filter element portion flexible through a range from a flat configuration to a cylindrical configuration for filtering fluid passing therethrough having a pair of ends;
   a first arcuate tip molded onto the first end;
   a second arcuate tip molded onto the second end for attachment to the first arcuate tip by mechanical bonding, subsequent to wrapping of the filter around the annular groove so that the filter is fixed in the annular groove.

2. A filter according to claim 1 wherein the first arcuate tip includes a plurality of projecting energy directors for connecting the second arcuate tip to the first by bonding wherein the energy directors are mechanically bonded to the second arcuate tip.

3. A filter according to claim 2 wherein the second arcuate tip includes a textured surface for an enhanced bonded connection to the first arcuate tip.

4. A filter assembly for installation in an annular groove of a solenoid housing the annular groove exhibiting a spool shaped housing section including a cylindrical body portion with an annular ridge on each end thereof having a first fluid passage extending radially through the cylindrical body portion and a connected second fluid passage extending through the spool section along its axis for fluid to flow therethrough, the filter assembly comprising:

a frameless wire mesh portion having a first and a second end;

a first arcuate plastic tip connected to the first end having an inside and an outside surface;

a second arcuate plastic tip connected to the second end having an inside and an outside surface;

wherein the frameless wire mesh portion engages the annular ridges of the spool section in particulate-tight contact therewith and the outside surface of the second arcuate plastic tip is bonded to the inside surface of the first arcuate plastic tip fixing the filter within the annular groove of the housing for filtering particles from the fluid before the fluid passes through the first fluid passage.

5. A filter assembly according to claim 4 wherein the second arcuate plastic tip includes a plurality of bond supports on the inside surface thereof maintaining a space between the cylindrical body of the spool shaped housing section and the arcuate plastic tips.

* * * * *